United States Patent [19]

Sprott et al.

[11] Patent Number: 4,627,338
[45] Date of Patent: Dec. 9, 1986

[54] APPARATUS FOR THE TREATMENT OF RUMINANT FORAGE MATERIAL OR SOIL

[75] Inventors: David J. Sprott, Lansing; C. Alan Rotz, Haslett, both of Mich.

[73] Assignee: Research Corporation, New York, N.Y.

[21] Appl. No.: 775,949

[22] Filed: Sep. 12, 1985

Related U.S. Application Data

[63] Continuation of Ser. No. 561,393, Dec. 14, 1983.

[51] Int. Cl.⁴ ............................................. A23K 1/22
[52] U.S. Cl. ........................................ 99/534; 99/516
[58] Field of Search .............. 99/486, 487, 467, 474, 99/477, 516, 536, 532–534; 426/69, 636, 319, 335, 807; 71/903; 111/6, 7

[56] References Cited

U.S. PATENT DOCUMENTS

| 2,768,896 | 10/1956 | Lewis | 99/534 X |
| 4,078,480 | 3/1978 | Luck | 99/516 X |
| 4,185,549 | 1/1980 | Roepnack | 100/45 |

OTHER PUBLICATIONS

S. V. Arya and G. E. Pickard, *Penetration of Liquid Jets in Soil*, Jan. 1958, pp. 16–19 and 23.

*Primary Examiner*—Timothy F. Simone
*Attorney, Agent, or Firm*—Scully, Scott, Murphy & Presser

[57] ABSTRACT

A method for the protection or preservation of a baled ruminant forage material, such as baled hay which is intended to be utilized as a cattle feed, or the treatment of a soil surface through injection with a liquid preservative and, more particularly, a novel and unique method for the injection of pressurized liquid preservatives such a anhydrous ammonia or proprionic acid, into the baled ruminant forage material or soil. Moreover, the invention contemplates the provision of a novel apparatus for effecting the injection of the pressured liquid preservative through the intermediary of the inventive method. When used with a baler, the injection system does not need to cycle with the baler, but injects the liquid preservative into the bale subsequent to the bale having been completely formed, and without the necessity for any reciprocating injector needles or probes having to penetrate into the baled ruminant forage material. In essence, the inventive apparatus eliminates the need for movable injector needles or probes and, moreover, necessitate the use of only one solenoid so as to simplify the system and enhance the degree of reliability of operation thereof. Injection valves having discharge orifices or jet-forming nozzles are adapted to be positioned in proximity to the surfaces of and adjacent the path of conveyance of a baled ruminant forage material, or proximate to a soil surface, and in timing with the movement of the baled material or upon sensing the presence thereof, the injection valves are adapted to direct one or more jets of the pressurized liquid preservative against the surface, such as to cause the liquid preservative to penetrate into the bale or soil surface, to vaporize and to disperse within the bale or soil.

20 Claims, 4 Drawing Figures

APPARATUS FOR THE TREATMENT OF RUMINANT FORAGE MATERIAL OR SOIL

This application is a continuation of application Ser. No. 561,393, filed Dec. 14, 1983.

BACKGROUND OF THE INVENTION

1. Field of the Invention

The present invention relates to a method for the protection or preservation of a baled ruminant forage material, such as baled hay which is intended to be utilized as a cattle feed, through injection with a liquid preservative and, more particularly, relates to a novel and unique method for the injection of pressurized liquid preservatives such as anhydrous ammonia or proprionic acid, into the baled ruminant forage material. Moreover, the invention contemplates the provision of a novel apparatus for effecting the injection of a pressured liquid preservative into a baled ruminant forage material through the intermediary of the inventive method.

Pursuant to another concept of the invention, the novel method and apparatus for the injection of pressurized liquid preservatives, such as anhydrous ammonia, is adapted to be employed for the treatment and protection of soil, particularly on sod farms, or turf farms utilized for the cultivation of grass for golf courses and the like.

The treatment or protection of a ruminant forage material with a liquid or gaseous preservative, such as anhydrous ammonia or proprionic acid, is extensively employed in agriculture, and is of particular use in the cattle feed industry. Basically, the utilization of anhydrous ammonia in a liquid or gaseous form is widely known as constituting a ruminant forage nutrient or protein additive, as well as forming a preservative, particularly for hay or similar types of cattle feed. In addition to the use of anhydrous ammonia, proprionic acid employed alone or in mixture with other organic acids has also been tested and found widespread applications as a forage preservative. In the treatment or protection of ruminant forage material, such as hay, considerable problems have been encountered in the correct and non-hazardous application of these preservatives. Thus, anhydrous ammonia and proprionic acid are extremely volatile in nature to thereby present hazards with regard to spontaneous combustion and, moreover, quickly dissipate into the atmosphere so as to resultingly lose a considerable degree of their effectiveness prior to their interaction with the forage material. This high level of volatility causes problems which are encountered during the application of the preservatives to the ruminant forage material and necessitates special measures to be taken in the development of products and apparatuses which will enable the preservatives to be dispersed in the forages, thereby considerably increasing capital outlays. In addition thereto, the preservatives are extremely corrosive to machinery, thereby appreciably increasing the cost of the machinery employed since the latter will rapidly depreciate during use.

2. Discussion of the Prior Art

Muller U.S. Pat. No. 1,196,138 discloses a process of impregnating a forage material, such as baled alfalfa hay, with molasses for the purpose of treating one substance with another material, thereby producing an edible substance while enhancing the nutritional value of the product which is generally employed as a ruminant forage material. The baled forage material is subjected to penetration by an injecting needle, and a suitable additive, such as molasses, is pumped into the bale of hay through the action of compressed air, with the bale concurrently being heated by means of steam in order to enhance the degree of dispersion of the molasses within the baled hay.

Manning U.S. Pat. No. 1,928,903 discloses an apparatus for treating a food stuff, such as a mass of grain which is contained within an upright container or silo, and wherein an elongated tubular member extends downwardly into the silo and, under a predetermined pressure head, is adapted to pump an additive, such as air having disinfectant entrained therein, into the mass of grain in order to retard spoilage of the stored grain material. The disinfectant may be a liquid such as carbon bisulfide and tetrachloride, which is admixed with air to provide a spray adapted to penetrate into and permeate the grain stored in the upright container or silo.

Millar U.S. Pat. No. 2,293,845 discloses the admixing of a ruminant feedstock, such as sugar-beet pulp and silage, with a material such as anhydrous ammonia in order to convert the nitrogen contained in the feedstock into useable protein so as to thereby enhance the nutrient level of the ruminant feed material.

Zick U.S. Pat. No. 2,789,906 discloses the treatment of an agricultural roughage material, such as cattle feed in the form of hay or the like, with anhydrous ammonia under vacuum or subatmospheric pressure conditions within a closed reacting chamber to thereby cause the generally gaseous ammonia to disperse throughout the roughage material. This prior art concept envisions placing the roughage, or ruminant forage material or cattle feed, into a closed or sealed chamber, imparting a vacuum to the interior of the chamber, and then injecting gaseous ammonia to propagate the required impregnation and resultant ammoniation of the cattle feed material.

Ulrey U.S. Pat. No. 3,259,501 discloses the treating of rice hulls with a gaseous nitrogen compound under superatmospheric pressure and at elevated temperature conditions in order to impart a softer texture and an increase in the content of nitrogen to the original rice hulls, thereby rendering the processed rice hulls more adaptable for use as a livestock feed, fertilizer and the like.

Lagerstrom et al. U.S. Pat. No. 4,182,780 discloses a process and apparatus for the alkali-treatment of a lignocellulosic forage material, such as hay which is utilized as a ruminant forage material, in which baled hay is enclosed within a container, is then subjected to a spray of a base and subsequently neutralized with an acid. After the lignocellulosic ruminant forage material is completely impregnated for a period extending over a number of hours, the liquid is allowed to drain from the forage material, and the impregnated bales of straw or hay are then removed to storage.

Johanning et al. U.S. Pat. No. 4,321,278 discloses the treatment of a ruminant animal feedstuff, which has relatively low crude protein content, by subjecting the material to chlorination, and thereafter treating the chlorinated feedstuff with ammoniation, such as subjecting the feedstuff to a flow of anhydrous ammonia or the like.

Other apparatuses and processes employed in the treatment of ruminant forage material for either enhancing the protein content thereof, or to act as a preservative in order to inhibit the formation of rot and mildew, are disclosed in Skov et al. U.S. Pat. No. 3,899,588; Sebald U.S. Pat. No. 1,516,314; Harper U.S. Pat. No. 2,843,534; Bonnel U.S. Pat. No. 2,810,649; and Henkle U.S. Pat. No. 2,004,001.

Although all of the above described or referenced U.S. patents relate to the treatment of cattle feed or ruminant forage material with a suitable liquid or gas which is adapted to either enhance the nutrient or protein value of the material, or to constitute a preservative which will inhibit the formation of rot and mildew, there is no disclosure of a simple and novel method and apparatus for injecting a liquid preservative into a baled ruminant forage material analogous to that described and claimed by the present applicants.

More recently, apparatus has been developed for injecting liquid anhydrous ammonia and/or proprionic acid into a ruminant forage material, such as hay which is in the stages of being formed into bales. Thus, as the windrowed hay is being conveyed by an auger into a baler, a plurality of ejector needles are intermittently advanced into the hay in timed sequence with the formation of the segments of the hay bale, and pressurized liquid anhydrous ammonia or any other suitable liquid hay preservative is injected from a suitable supply source through the discharge orifices of the injector needles into the hay. The injection of the pressurized stream of the liquid preservative will cause the latter to disperse in the form of a spray within the hay so as to provide for the rapid vaporization of the preservative. However, the requirement for continuous and timed reciprocation of the injector needles while injecting jets of pressurized liquid anhydrous ammonia into the hay as the latter is being baled, requires precise mechanical correlation in advancing the needles into the hay and retracting the latter with the intermittent bale-forming steps, of the baler, thereby considerably increasing expenditures in the need for complicated machinery and timing devices which will coordinate the advance and retraction of the liquid preservative injector needles with the various baling steps of the hay baling apparatus. Moreover, the necessity for the systematic advance and retraction of a plurality of injector needles into the hay as the latter is being baled, in which probes or injector needles must each be connected to an associated flexible hose and operating solenoids, and wherein the complex of injector needles and related hardware must be functionally cycled to provide for an injection of liquid preservative which is synchronized with each stroke of the baler, approximately eight to ten times for the formation of each bale, is subject to frequent breakdowns of the injection system. The complexity of present day liquid preservative injection systems and methods, necessitating the employment of complicated apparatus and reciprocating injector needles, and their tendency towards mechanical breakdowns and operational failures, result in time consuming and costly work stoppages in the baling of the ruminant forage material.

Moreover, quite frequently, the liquid preservative injection systems are mounted on the undercarriage of the hay baler so as to be normally hidden from the view of the baler operator. Consequently, inasmuch as the operator cannot see the apparatus, breakdowns of the injection system may be undetected so as to create a potentially hazardous, and in any event, undesirable operating condition. The hazard which is created in response to any breakdown of the equipment lies in that the injection of the liquid preservative, such as anhydrous ammonia, permits the operator to bale the hay at high moisture levels; thus, if the injection system fails to inject the correct amount of liquid anhydrous ammonia, this can readily lead to a fire hazard or mold-damaged hay.

SUMMARY OF THE INVENTION

Accordingly, in order to ameliorate or eliminate the drawbacks and disadvantages encountered in prior art injection systems for the treatment of a ruminant forage material, such as baled hay, with a liquid preservative comprising, for example, anhydrous ammonia and/or proprionic acid, the present invention contemplates the provision of an apparatus wherein the injection system is mounted in full view of the operator of the baler. Moreover, the injection system does not need to cycle with the baler but injects the liquid preservative into the bale subsequent to the bale having been completely formed, and without the necessity for any reciprocating injector needles or probes having to penetrate into the baled ruminant forage material. In essence, the inventive apparatus eliminates the need for movable injector needles or probes and, moreover, necessitate the use of only one solenoid so as to simplify the system and enhance the degree of reliability of operation thereof.

Thus, the apparatus for treating a ruminant forage material, such as baled hay, with a liquid preservative, for example, liquid anhydrous ammonia and/or proprionic acid, contemplates the provision of an injection system wherein injection valves having discharge orifices or jet-forming nozzles are adapted to be positioned in proximity to the surfaces of and adjacent the path of conveyance of a baled ruminant forage material, and in timing with the movement of the baled material or upon sensing the presence thereof, the injection valves are adapted to direct one or more jets of the pressurized liquid preservative against the surface or surfaces of the baled material, such as to cause the liquid preservative to penetrate into the bale, to vaporize and to disperse within the bale.

In one specific embodiment, the inventive liquid preservative injection apparatus contemplates the provision of a syringe member which communicates with a source of supply for the liquid preservative, and wherein a plunger extending into the syringe member, which forms a piston of a hydraulic cylinder, is adapted to be retracted from the syringe member so as to cause the latter to be filled with a quantity of the liquid preservative aspirated from the supply source. Upon a forward stroke of the piston of the hydraulic cylinder into the syringe member, the liquid preservative contained in the latter is pressurized, and the pressurized liquid preservative forced out from the syringe member towards the injection valves and expelled through the discharge orifices against the surface of the baled ruminant forage material so as to penetrate into the bale.

A particular feature of the inventive apparatus consists of in that the hydraulic cylinder is actuated through an electronic timing circuit which is responsive to a cam-actuated microswitch in dependence upon the movement or location of a bale of the forage material, and wherein suitable pressure may be imparted to the hydraulic cylinder through the intermediary of a directional control valve such as to provide for the actuation of the anhydrous ammonia-containing syringe member.

If desired, the pressurization and operation of the hydraulic cylinder may be effected from the hydraulic system of a tractor towing the baler, thereby obviating the necessity for the provision of a separate hydraulic system for the preservative injection apparatus.

Pursuant to another aspect of the present invention, the present invention may provide for a double-acting hydraulic cylinder adapted to cooperate with two syringe members which receive liquid preservative from a suitable supply source or storage tank, whereby upon the pressurization of one syringe member and the expulsion of the pressurized liquid preservative therefrom towards a baled ruminant forage material, the second injection syringe member is concurrently adapted to aspirate liquid preservative from the supply source, thereby increasing the rate of operation and output of the entire liquid preservative injection system.

It is also possible, in a simple manner, to modify the inventive apparatus whereby the jet-forming nozzles which dispense the liquid anhydrous ammonia may be oriented so as to inject the liquid into the ground rather than into a baled ruminant forage material. This is of particular advantage when treating soil, such as on sod farms, or treating grass cultivated on turf farms.

Accordingly, it is an object of the present invention to provide a liquid preservative injection apparatus for a ruminant forage material, which is extremely simple in operation and structure in comparison with systems pursuant to the current state of the technology.

A more specific object of the present invention is to provide an apparatus for injecting completed bales of a ruminant forage material, such as hay, with a liquid preservative which may comprise liquid anhydrous ammonia and/or proprionic acid, without the necessity of requiring reciprocating probes or injector needles to penetrate into the ruminant forage material while the latter is being formed into bales, through the simple expedient of directing one or more jets of the pressurized liquid preservative against the surfaces of the baled forage material so as to penetrate into the bale.

Still another object of the present invention is to provide an apparatus for injecting liquid preservative into baled ruminant forage material wherein jets of pressurized liquid preservative are directed against the surfaces of the baled forage material in timed relationship with the sensing of the presence or movement of the baled material relative to the location of the discharge orifices from which the jets of liquid preservative are expelled.

A still further object of the present invention resides in the provision of an apparatus as described hereinabove, which is modified in minor respects so as to enable its utilization in the treatment of soil, or sod and turf farms.

Yet another object of the present invention is to provide a method for the treatment of a baled ruminant forage material or soil, sod and turf farms, with a liquid preservative utilizing the novel apparatus or system as described hereinabove.

BRIEF DESCRIPTION OF THE DRAWINGS

These and other objects of the present invention for the treatment and protection of a ruminant forage material, such as baled hay or soil, sod and turf farms employed in the cultivation of grass, with a liquid preservative which may comprise liquid anhydrous ammonia and/or proprionic acid may be readily ascertained from the following detailed description of preferred exemplary embodiments of the invention, taken in conjunction with the accompanying drawings; in which.

DETAILED DESCRIPTION

Figure 1:
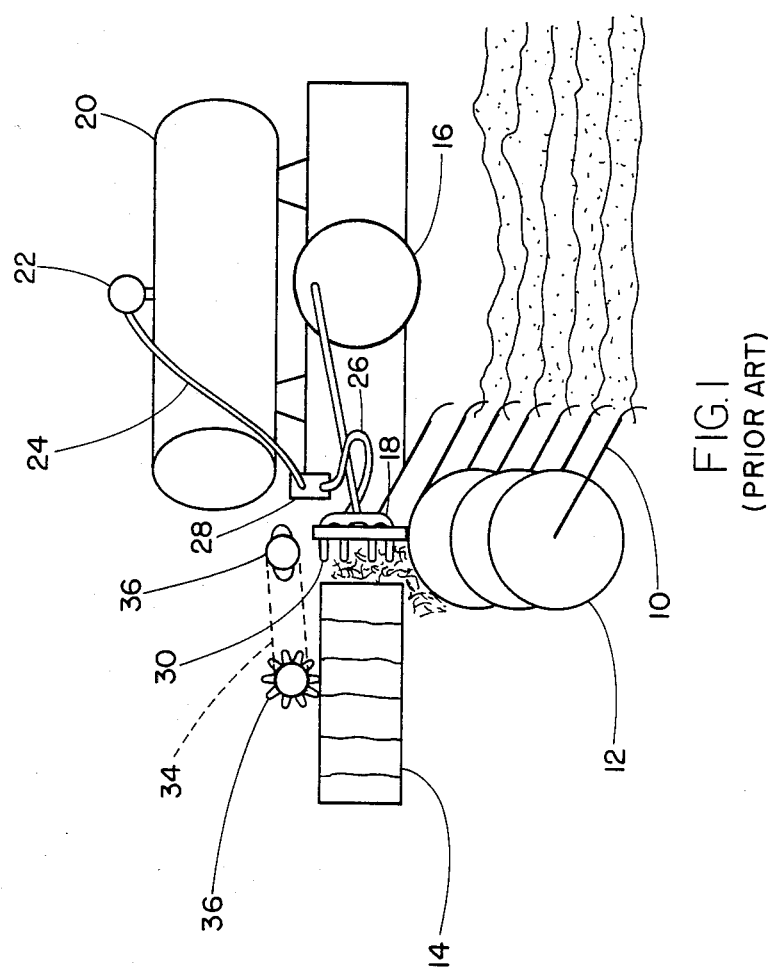
FIG. 1 illustrates a generally diagrammatic representation of a prior art apparatus for the treatment of a ruminant forage material, which is in the process of being baled, with a liquid preservative.

Referring now in detail to FIG. 1 of the drawings illustrated therein is a usual prior art system for the treatment of a ruminant forage material, such as hay in the course of being baled, through the intermediary of a liquid preservative; for example, liquid anhydrous ammonia. In that instance, the liquid preservative injecting system is associated with a baler which consists of a suitable windrow pickup 10 for the takeup of windrowed hay, and a hay intake auger 12 for conveying the hay to a baling mechanism. Periodically, during the formation of successive portions of each bale of hay 14, a flywheel 16 reciprocates a hay plunger 18 towards and away from the bale of hay 14 which is being formed in the baler. A tank 20 containing a supply of pressurized liquid anhydrous ammonia ($NH_3$) includes a flow regulator 22 having a first hydraulic hose 24 communicating with a second hydraulic hose 26 through a valve 28 in order to be able to supply the liquid ammonia to a plurality of injector needles 30 which are mounted on the hay plunger 18. A cam 32 is connected through a suitable drive chain 34 with a bale counter starwheel 36 for determining the presence and advance of the hay being baled by the baling arrangement. Intermittently, and in synchronism with the advance of each formed portion of the bale of hay, the injector needles are advanced to penetrate into the last-formed portion of the bale of hay 14, and concurrently a predetermined quantity of pressurized liquid anhydrous ammonia is expelled through the injector needles 30 into the hay bale.

The foregoing arrangement pursuant to the prior art necessitates the reciprocating strokes and timing of the injector needles to be synchronized with the timing in the formation of each bale portion 14, up to eight to ten times for each bale, in order to ensure that sufficient liquid anhydrous ammonia is vaporized and dispersed throughout the bale of hay. The continuous reciprocation causes an undue amount of wear of the moving components of the injection system, and the injector needles 30 also tend to frequently break during operation, or alternatively, to become clogged with pieces of hay or dirt so as to render the injector needles inoperative. The large number of moving parts of the apparatus, such as the flywheel 16, the connecting rod interconnecting the hay plunger 18 and the injector needles 30, and the needles themselves, provide numerous locations at which undue wear and operating breakdowns may readily occur. Moreover, the necessary synchronization between the reciprocation of the injector needles and the formation of the hay portions also requires the employment of complex controls which are also readily susceptible to wear and breakdowns. Moreover, the entire arrangement for reciprocating the injector needles and injecting the liquid anhydrous ammonia is generally out of the view of the operator of the baling arrangement, thereby causing the operator to be frequently unaware of any problems which have occurred during operation, thus leading to possible fire hazards in the injection of the liquid anhydrous ammonia and excessive moisturizing of the hay.

Figure 2:
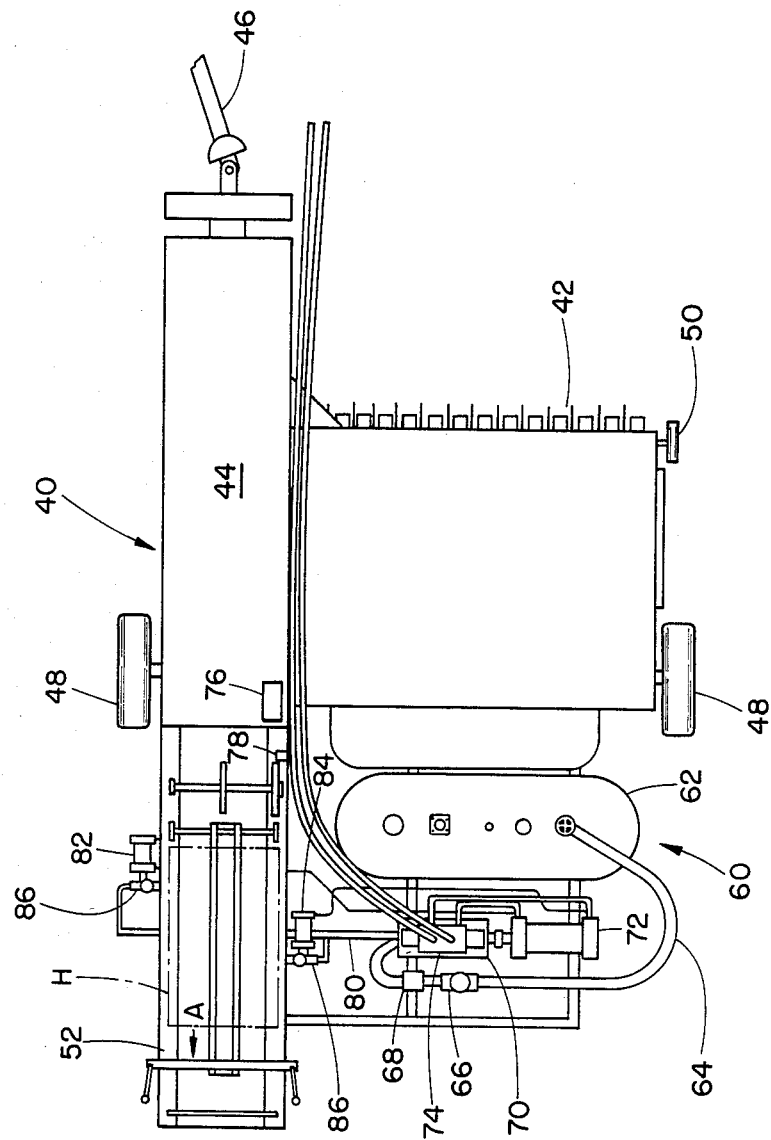
FIG. 2 illustrates a generally schematic plan view of an apparatus for the treatment of a baled ruminant forage material pursuant to the invention, the apparatus being shown in operation with a hay baler.
Figure 3:
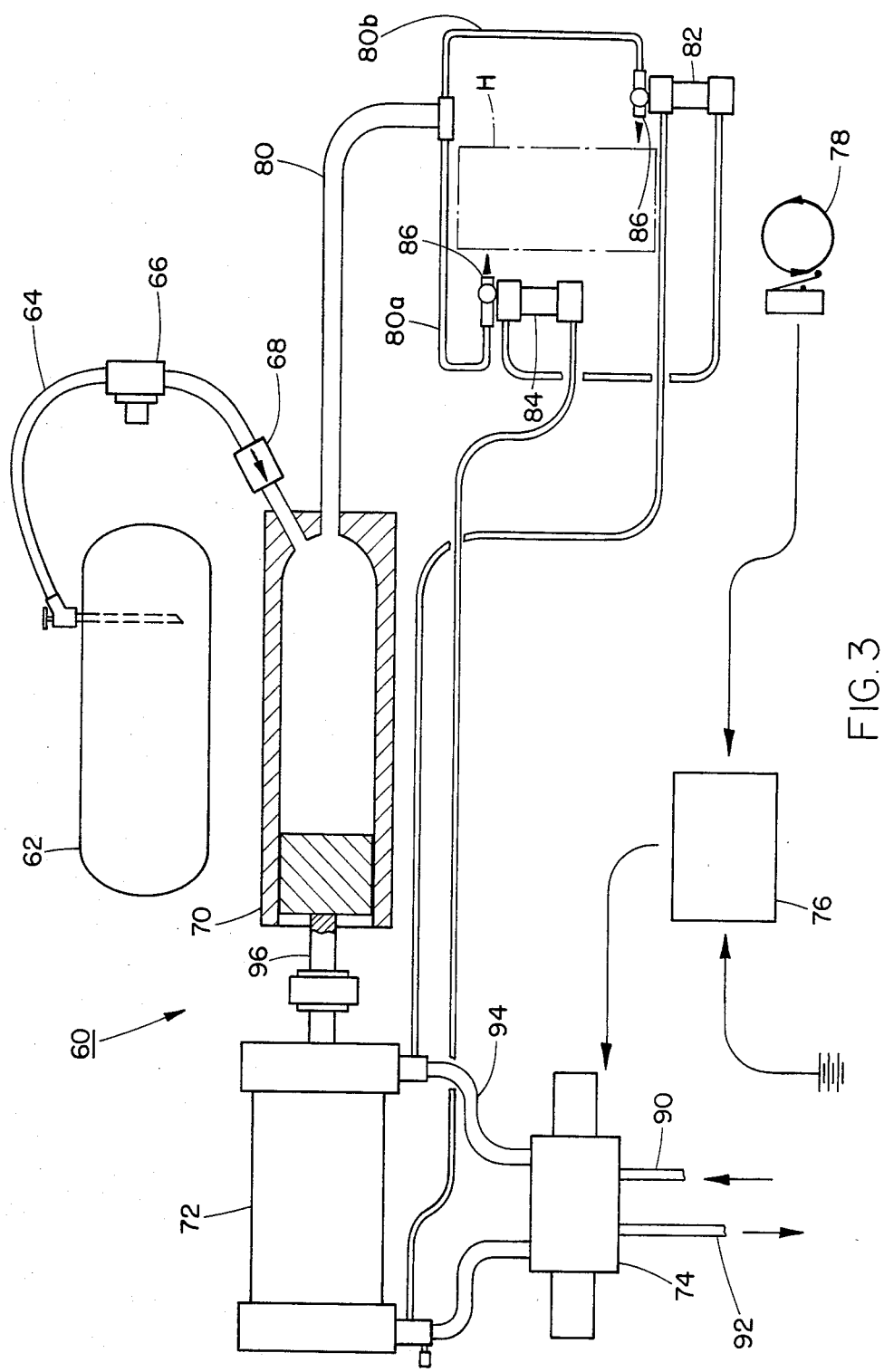
FIG. 3 illustrates a generally schematic representation of the components of the apparatus of FIG. 2 utilized for the treatment of a baled ruminant forage material with a pressurized liquid preservative.

Referring now in particular to the embodiment of the inventive apparatus for treating a baled ruminant forage material with a liquid preservative, as illustrated in FIGS. 2 and 3 of the drawings, in FIG. 2 there is illustrated a generally diagrammatic plan view of the apparatus shown operatively associated with a hay baler.

In the specific embodiment as disclosed herein, a transportable or vehicular baling arrangement for ruminant forage material may consist of a hay baler 40, and includes a windrow pickup 42 for hay which is adapted to be conveyed, in a manner known per se, to a hay intake auger and then transported into a baler 44. The baler is adapted to be attached to a suitable tractor (not shown) by means of a yoke 46. The entire baling arrangement 40 is adapted to be supported for conveyance along the terrain on transport wheels 48, 50. A suitable platform 52 is adapted to receive formed bales of hay H from the baling arrangement 40, with the hay bales H being transportable in the direction of the arrow A.

The inventive forage material treatment or preservation apparatus 60 may be mounted contiguous with or arranged on the hay baling arranged 40 so as to be transportable with the latter. The liquid preservative injection system for the treatment of the baled hay H incorporates a closed storage tank 62 containing a quantity of liquid anhydrous ammonia or, if desired, liquid propionic acid. A discharge hose 64 leading from the storage tank 62 communicates through a solenoid valve 66 and non-return valve 68 with one end of a cylindrical syringe member 70 for the liquid anhydrous ammonia.

A hydraulic cylinder unit 72, which is adapted to be actuated by a control valve 74, includes a reciprocating piston forming a plunger extending into the anhydrous ammonia syringe member 70. An electronic timing device 76, and a cam-operated microswitch unit 78 are operatively interconnected with the control valve 74, as is explained in detail hereinbelow in connection with FIG. 3 of the drawings. Conduits 80, 80a and 80b lead from a discharge port in the anhydrous ammonia syringe member 70 to, respectively, injection valves 82 and 84 which are arranged on opposite sides of the baler platform 52, and each includes discharge orifices or nozzles 86 which are adapted to direct jets of pressurized anhydrous ammonia against the surface of the baler of hay H at various locations.

Referring in detail to the apparatus for injecting a liquid preservative into a ruminant forage material, such as baled hay, as illustrated in the diagrammatic representation of FIG. 3 of the drawings, the operation of the apparatus is basically as follows:

The storage tank 62 is filled with a supply of a suitable liquid preservative, such as anhydrous ammonia or proprionic acid. When a bale of hay H is located on the platform 52 between the injection valves 82 and 84, which are positioned on both sides of the platform, such as by means of the cam-operated microswitch unit 78, rotation of the cam will cause the microswitch to be actuated and to thereby, in turn, activate the electronic timing circuit 76. The circuit 76 may be supplied with power from a suitable voltage source; for instance, a 12-volt battery or the like.

The electronic timing circuit 76 then activates the hydraulic directional control valve 74, the valve being supplied with hydraulic pressure through hydraulic cable lines 90 and 92, of which the former may be a pressure line and the second a return line. The lines 90 and 92 may be supplied with hydraulic fluid from the hydraulic system of a tractor, thereby avoiding the necessity of furnishing a separate hydraulic pressure system for the present apparatus. The pressure supplied through line 90 will cause hydraulic pressure to be directed through line 94 into one end of the hydraulic cylinder 72 so as to cause the plunger end of the piston 96 to be retracted from the chamber of cylindrical syringe member 70. The retraction of the piston 96 will generate a vacuum or reduced pressure in the chamber of the syringe member 70, thereby aspirating liquid anhydrous ammonia (or other liquid preservative) from the storage tank 62 through the conduit 64 and the now opened solenoid valve 66 and through non-return valve 68 into the interior of syringe member 70, and filling the latter with the liquid preservative.

Upon continued rotation of the cam 78, the microswitch will again actuate the electronic timing circuit so as to vent the hydraulic pressure from lines 90 and 94, and cause the hydraulic pressure to act on the opposite end of the hydraulic cylinder, thereby extending the piston 96 and its plunger and into the chamber of the anhydrous ammonia syringe member 70. The non-return valve 68 and the now closed solenoid valve 66 will prevent the liquid preservative flowing back into the storage tank 62 from the syringe member 70, thereby causing the liquid preservative in the syringe member to be pressurized and conducted from the syringe discharge port through line 80 and lines 80a and 80b to the injection valves 84 and 82, and jets of pressurized liquid preservative to be ejected through the discharge orifices or nozzles 86 against the surfaces of the hay bale H.

Continued rotation of the cam 78 will again actuate the microswitch associated therewith so as to cause the piston 96 to be retracted from the syringe member in a manner as described hereinabove, and to refill the syringe with liquid preservative from the storage tank so as to be in a state of preparedness for the subsequent injection of a bale of hay. The foregoing sequence may be repeated at different locations of the same hay bale H as the latter is being transported along the baler platform 52, or held in readiness for injection into a subsequent bale.

Figure 4:
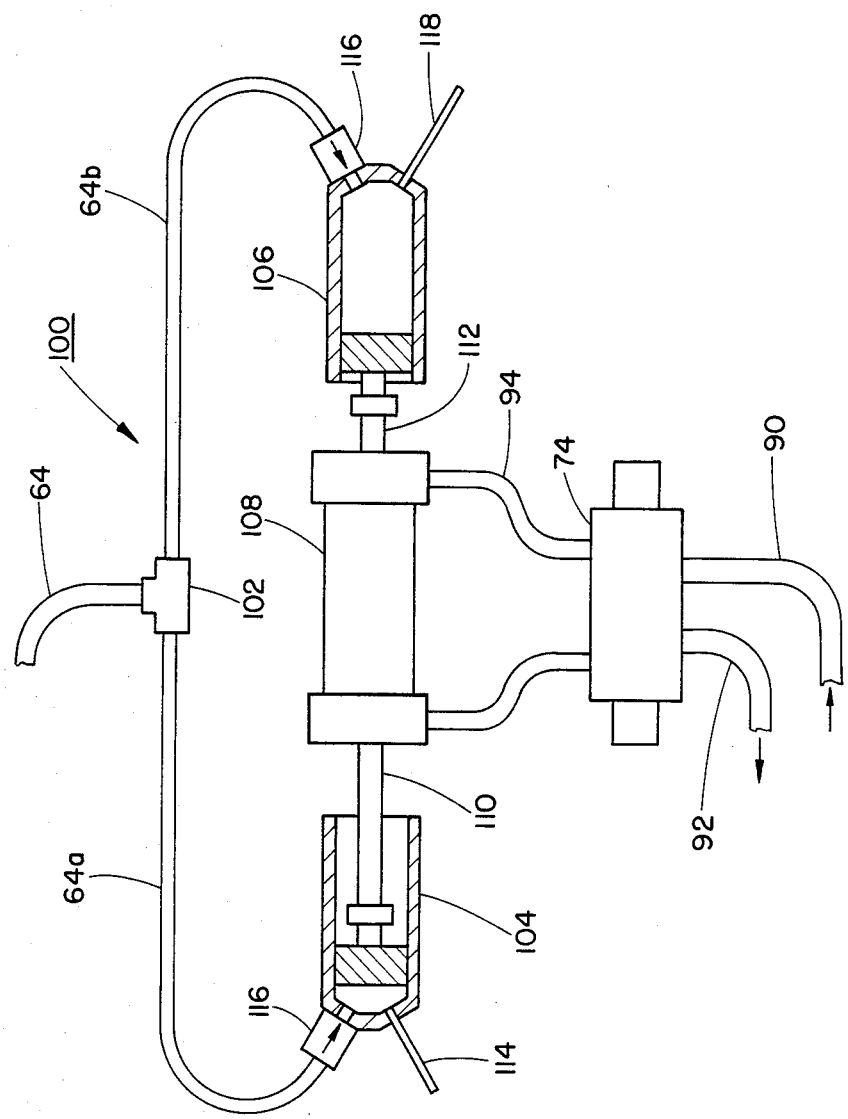
FIG. 4 is a view similar to FIG. 3 showing a modified embodiment of the inventive apparatus.

Referring now to the embodiment of the apparatus illustrated in FIG. 4 of the drawings, wherein similar or identical components to those shown in FIGS. 2 and 3 are designated with the same reference numerals, the liquid preservative injection apparatus 100 disclosed herein operates generally in a similar manner with that of the preceding embodiment. However, in this instance, the liquid preservative which is aspirated through conduit 64 from the storage tank is divided by means of a T-connector 102 into two separate flows which are conducted, respectively, through conduits 64a and 64b so as to be supplied to two separate liquid preservative or anhydrous ammonia syringe members 104 and 106. Interposed between the syringe members 104, 106 is a double-acting hydraulic cylinder 108 which includes reciprocating pistons 110 and 112 projecting from opposite ends thereof, and which have plunger ends extending into the respective syringe members 104 and 106.

Thus, upon actuation of the directional control valve 74 in a manner as described hereinabove, while the hydraulic cylinder has one piston 110 extended so as to pressurize the liquid preservative contained in the syringe member 104, the piston 112 at the opposite end of the hydraulic cylinder 108 is retracted into the cylinder 108 so as to aspirate liquid preservative from the storage tank into the syringe member 106 through conduit 64b.

Thus, as the pressurized liquid preservative in the syringe member 104 is conducted through conduit 114 towards associated injection valves and ejected from their discharge orifices or nozzles (not shown) in a manner as described with reference to the embodiment of FIG. 3, and wherein any return flow of liquid preservative to the storage tank through conduit 64 is prevented by a non-return valve 116 interposed in the conduit 64a, the retraction of the piston 112 into the hydraulic cylinder 108 will aspirate liquid into the chamber of the syringe member 106 from the storage tank through conduit 64b so as to place the syringe member 106 into a state of preparedness for a subsequent operating stroke, propelling pressurized liquid preservative through conduit 118 towards an associated injection valve and discharge orifice (not shown).

Consequently, the utilization of two syringe members 104, 106 having a double-acting hydraulic cylinder 108 interposed therebetween will increase or double the rate of operation or output of the apparatus 100 in contrast with the apparatus 60, and may also facilitate the concurrent injecting of liquid preservative into a plurality of bales of hay rather than individually as is the case in the previously described embodiment. This will greatly enhance the capacity and versatility of the apparatus without necessitating the utilization of an undue number of additional structural components.

Although the foregoing apparatus has been described in conjunction with the use of, for example, two injection valves and associated discharge orifices, it will be readily apparent to one skilled in the art that further branch conduits may be tapped off from the respective liquid preservative feed line 64 to allow for the supply of a larger number of injection valves and discharge nozzles so as to be able to inject jets of liquid preservative into a plurality of bales of hay at a number of locations.

The novel apparatus need not be necessarily employed in conjunction with a hay baler, but may be used at other locations for the treatment of ruminant forage material.

Thus, for example, instead of the orifices or nozzles 86 as illustrated in FIGS. 2 and 3 being oriented so as to face towards a baled ruminant forage material H, the nozzles 86 may be rotated to face downwardly towards the ground by being fastened to suitable tractor-mounted brackets (not shown), replacing the baler platform 52 and baler arrangement 40. This will enable the inventive apparatus to be employed in the treatment of soil, sod farms or turf farms cultivating grass, such as for golf courses and the like.

While there has been shown and described what are considered to be preferred embodiments of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. An apparatus for protecting a formed bale of tightly compacted, interwoven fibrous material with a liquid preservative; comprising a bale platform for receiving the formed bale along a predetermined path; storage means for a supply of said liquid preservative; means for withdrawing a quantity of said liquid preservative from said storage means; means for pressurizing said withdrawn liquid preservative; injection valve means for receiving a quantity of said pressurized liquid preservative from said pressurizing means; said valve means including at least one jet spray discharge orifice located closely adjacent said predetermined path of dispense a high pressure jey spray of the pressurized liquid preservative through an outside surface of the baled material and into the interior thereof to vaporize and disperse the liquid preservative throughout the baled material; and control means for actuating said valve means to eject said pressurized liquid preservative from said discharged orifice.

2. An apparatus as claimed in claim 1, including timing means for regulating the amount and period of time said pressurized liquid preservative is ejected into said bail through said discharge orifice.

3. An apparatus as claimed in claim 1, said injection valve means including a plurality of said jet spray discharge orifices arranged at different locations realtive to surfaces of said baled material for concurrently ejecting a plurality of jets of said pressurized liquid preservative against the surfaces of said baled material.

4. An apparatus as claimed in claim 1, said control means comprising at least one syringe member, flow conduit means interconnecting said syringe member with said liquid preservative storage means; a hydraulic cylinder including piston means reciprocable therein so that retraction of said piston into said hydraulic cylinder aspirates liquid preservative from said storage means into said syringe member for filling said syringe member with said liquid preservative.

5. An apparatus as claimed in claim 4, comprising means for reciprocating said piston means within said syringe member to pressurize the liquid preservative and convey said pressurized liquid preservative into the injection valve means; and non-return valve means being interposed in the flow conduit means to inhibit return flow of pressurized liquid preservative from said syringe member to said storage means.

6. An apparatus as claimed in claim 5, said means for reciprocating said piston means comprising a directional control valve operatively connected to said hydraulic cylinder.

7. An apparatus as claimed in claim 6, comprising an electronic timing circuit for actuating said directional control valve.

8. An apparatus as claimed in claim 7, comprising means responsive to the presence and positioning of the bale of material on the baler platform for activating said timing circuit so as to cause said valve means to eject said predetermined quantity of said pressurized liquid preservative from said discharge orifice into said bale of material.

9. An apparatus as claimed in claim 8, said timing circuit-activating means comprising a cam-operated microswitch actuated through contact with the bale of material.

10. An apparatus as claimed in claim 1, said control means comprising a double-acting hydraulic cylinder including a plurality of reciprocable piston means extending from opposite ends of the hydraulic cylinder; syringe means at each end of said hydraulic cylinder, each said syringe means receiving respectively one of said piston means for reciprocatory movement therein; conduit means interconnecting each said syringe means with said storage means for liquid preservative, said reciprocating piston means alternatingly aspirating liquid preservative into respectively one of said syringe means during each stroke of said hydraulic cylinder while conveying pressurized liquid preservative from the other of said syringe means to injection valve means associated therewith for ejecting said pressurized liquid preservatives against a plurality of surface locations.

11. An apparatus as claimed in claim 10, including timing means for regulating the amount and period of time of said pressurized liquid preservative being ejected against a surface through each of said discharge orifices.

12. An apparatus as claimed in claim 11, comprising means for reciprocating each said piston means within the syringe member associated therewith to pressurize the liquid preservative and convey said pressurized liquid preservatives into the injection valve means; and non-return valve means being arranged to inhibit return flow of pressurized liquid preservative from each said syringe member to said storage means.

13. An apparatus as claimed in claim 12, said means for reciprocating each said piston means comprising a directional control valve operatively connected to said hydraulic cylinder.

14. An apparatus as claimed in claim 13, comprising an electronic timing circuit for actuating said directional control valve.

15. An apparatus as claimed in claim 14, comprising means responsive to the presence and positioning of the bale of said material on the baler platform for activating said timing circuit so as to cause valve means to eject said predetermined quantity of said pressurized liquid preservative from said discharge orifice into said bale of material.

16. An apparatus as claimed in claim 15, said timing circuit-activating means comprising a cam-operated microswitch actuated through contact with the bale of material.

17. An apparatus as claimed in claim 1, wherein said liquid preservative comprises anhydrous ammonia.

18. An apparatus as claimed in claim 1, wherein said liquid preservative comprises proprionic acid.

19. An apparatus as claimed in claim 1 wherein:
the jet spray discharge orifice is located closely adjacent a first side of said predetermined path for dispensing the jet spray onto a first surface of the formed bale; and
the injection valve means further includes another jet spray discharge orifice located closely adjacent a second side of said predetermined path for dispensing another jet spray onto a second surface of the formed bale, opposite the first surface.

20. An apparatus as claimed in claim 1 further comprising:
a timing circuit for controlling the time the jet spray is dispensed from the jet spray discharge orifice;
a switch connected to the timing circuit and an electrical energy source, and having a closed position for conducting electric current from the electrical energy source to the timing circuit; and
a cam located in a path of travel of the formed bale on the bale platform to close the switch and activate the timing circuit when the formed bale reaches a predetermined location on the bale platform.

* * * * *